United States Patent [19]
Schipper et al.

[11] Patent Number: 5,987,378
[45] Date of Patent: Nov. 16, 1999

[54] VEHICLE TRACKER MILEAGE-TIME MONITOR AND CALIBRATOR

[75] Inventors: John F. Schipper, Palo Alto; Eric B. Rodal, Morgan Hill; James M. Janky, Los Altos; David J. Cowl, Sunnyvale, all of Calif.

[73] Assignee: Trimble Navigation Limited, Sunnyvale, Calif.

[21] Appl. No.: 08/736,133

[22] Filed: Oct. 24, 1996

[51] Int. Cl.$^6$ ........................................ G06G 7/78
[52] U.S. Cl. ................................ 701/207; 342/457
[58] Field of Search .................... 701/207, 205, 701/210, 213, 216, 219, 29, 35; 340/568, 572, 825.54, 825.49

[56] References Cited

U.S. PATENT DOCUMENTS

| | | | |
|---|---|---|---|
| 3,983,378 | 9/1976 | Tammi | 235/151.32 |
| 4,593,263 | 6/1986 | Peckworth | 340/52 D |
| 4,630,292 | 12/1986 | Juricich et al. | 377/20 |
| 4,685,061 | 8/1987 | Whitaker | 364/424 |
| 4,751,512 | 6/1988 | Longaker | 342/357 |
| 4,875,167 | 10/1989 | Price et al. | 364/424.04 |
| 4,879,732 | 11/1989 | Dorosz | 377/24.2 |
| 4,945,753 | 8/1990 | Twombly | 73/2 |
| 5,014,206 | 5/1991 | Scribner et al. | 701/207 |
| 5,018,087 | 5/1991 | Dannenberg | 364/571.01 |
| 5,045,861 | 9/1991 | Duffett-Smith | 342/457 |
| 5,046,007 | 9/1991 | McCrery et al. | 364/424.04 |
| 5,122,961 | 6/1992 | Toyama et al. | 364/449 |
| 5,156,038 | 10/1992 | Kozikaro | 73/1 D |
| 5,173,710 | 12/1992 | Kelley et al. | 342/463 |
| 5,267,159 | 11/1993 | O'Neall | 364/424.04 |
| 5,311,430 | 5/1994 | Ishigami | 364/424.04 |
| 5,337,236 | 8/1994 | Fogg et al. | 364/424.04 |
| 5,359,528 | 10/1994 | Haendel et al. | 364/424.04 |
| 5,410,478 | 4/1995 | Richard et al. | 364/424.01 |
| 5,428,542 | 6/1995 | Liesveld | 364/424.04 |
| 5,434,788 | 7/1995 | Seymour et al. | 364/449 |
| 5,463,398 | 10/1995 | Young | 342/46 |
| 5,477,228 | 12/1995 | Tiwari et al. | 342/357 |
| 5,497,323 | 3/1996 | McCall et al. | 364/424.04 |
| 5,499,182 | 3/1996 | Ousborne | 364/424.04 |
| 5,525,998 | 6/1996 | Geier | 342/357 |
| 5,541,845 | 7/1996 | Klein | 701/207 |
| 5,541,858 | 7/1996 | Warner | 364/561 |
| 5,557,524 | 9/1996 | Maki | 364/424.04 |
| 5,777,580 | 7/1998 | Janky et al. | 342/457 |

OTHER PUBLICATIONS

Tom Logsdon, "The Navstar Global Positioning System," pp. 1–91, Van Nostrand Reinhold, 1992.

"Loran–C User Handbook," U.S. Department of Transportation, U.S. Coast Guard, Commandant Publication P16562.5, Nov. 1992.

*Primary Examiner*—William A. Cuchlinski, Jr.
*Assistant Examiner*—Arthur D. Donnelly
*Attorney, Agent, or Firm*—John F. Schipper

[57] ABSTRACT

A system for monitoring location and speed of a vehicle, using a location determination system such as GPS, GLONASS or LORAN and an optional odometer or speedometer, for determining and recording the locations and times at which vehicle speed is less than a threshold speed for at least a threshold time (called a "vehicle arrest event"). Vehicle arrest event locations, times and time intervals are stored and/or printed to provide trip and mileage records and for efficiency monitoring. A vehicle odometer and/or speedometer can also be calibrated and/or corrected using this approach.

34 Claims, 8 Drawing Sheets

VEHICLE TRACKER MILEAGE-TIME MONITOR AND CALIBRATOR

FIELD OF THE INVENTION

This invention relates to use of a location determination system to track motion and stopping of a vehicle over a substantial time interval and to calibrate a vehicle odometer/speedometer.

BACKGROUND OF THE INVENTION

A vehicle operator or owner may wish to track the movements of a vehicle, or of a fleet of vehicles, over the course of a time interval such as a workday, a workweek or some other time interval, as the vehicle moves from location to location. If the vehicle operator usually operates a particular vehicle himself or herself, the vehicle owner or operator may remember vaguely where the vehicle has gone in the course of a day or week but may not remember the time at which the vehicle arrived or departed and/or may not remember the order of the locations at which the vehicle arrived.

Some workers have already proposed vehicle tracking systems loosely related to odometer readings, such as providing vehicle service reminders, recording information to support fuel tax rebates, supporting entry of vehicle trip data, distinguishing between business and personal travel, spotting of golf balls relative to a target (golf ball hole), recording vehicle mileage in each of two or more states, measuring vehicle driver performance, and aiding in determining vehicle heading. These purpose are disclosed by Peckworth in U.S. Pat. No. 4,593,263, by Juricich et al in U.S. Pat. No. 4,630,292, by Whitaker in U.S. Pat. No. 4,685,061, by Price et al in U.S. Pat. No. 4,875,167, by Dorosz in U.S. Pat. No. 4,879,732, by McCrery et al in U.S. Pat. No. 5,046,007, by O'Neall in U.S. Pat. No. 5,267,159, by Fogg et al in U.S. Pat. No. 5,337,236, by Haendel et al in U.S. Pat. No. 5,359,528, by Liesveld in U.S. Pat. No. 5,428,542, by McCall et al in U.S. Pat. No. 5,497,323, by Ousborne in U.S. Pat. No. 5,499,182, by Geier in U.S. Pat. No. 5,525,998, by Warner in U.S. Pat. No. 5,541,858, and by Maki in U.S. Pat. No. 5,557,524.

Calibration and correction of odometer and/or speedometer readings and mechanisms are disclosed by Tammi in U.S. Pat. No. 3,983,378, by Twombly in U.S. Pat. No. 4,945753, by Dannenberg in U.S. Pat. No. 5,018,087, by Toyama et al in U.S. Pat. No. 5,122,961, by Kozikaro in U.S. Pat. No. 5,156,038, by Richard et al in U.S. Pat. No. 5,410,478, and by Seymour et al in U.S. Pat. No. 5,434,788.

None of these systems fully integrates odometer information with information obtainable from a location determination (LD) system, such as a Global Positioning System (GPS), a Global Orbiting Navigational Satellite System (GLONASS) or a Long Range Navigation (LORAN) system. What is needed is a system, carried on a vehicle, that can utilize odometer information and vehicle location and velocity information provided by an LD system to determine and display upon command (1) locations where the vehicle has stopped for at least a threshold time interval (a "vehicle arrest event"), (2) measures of vehicle user performance, such as the length of time a vehicle has been substantially motionless and (3) results of calibration of a conventional odometer and/or speedometer associated with the vehicle. Preferably, the system should be flexible enough to allow parameters such as the length of the threshold time interval, locations where vehicle arrest is appropriate, and related parameters to be changed at frequent intervals, or on the fly.

SUMMARY OF THE INVENTION

These needs are met by the invention, which provides a vehicle location determination system, optionally linked to the vehicle odometer, that: (1) tracks vehicle location and motion; (2) determines and stores the location coordinates for each location at which a vehicle arrest event occurs, and the time interval associated with each vehicle arrest event; (3) notes and stores a vehicle mileage reading at the location of each vehicle arrest event; (4) provides one or more measures of vehicle user performance related to the length of time consumed by a vehicle arrest event; and (5) provides calibration and/or correction for a conventional vehicle odometer or speedometer.

DESCRIPTION OF BEST MODE OF THE INVENTION

Figure 1:
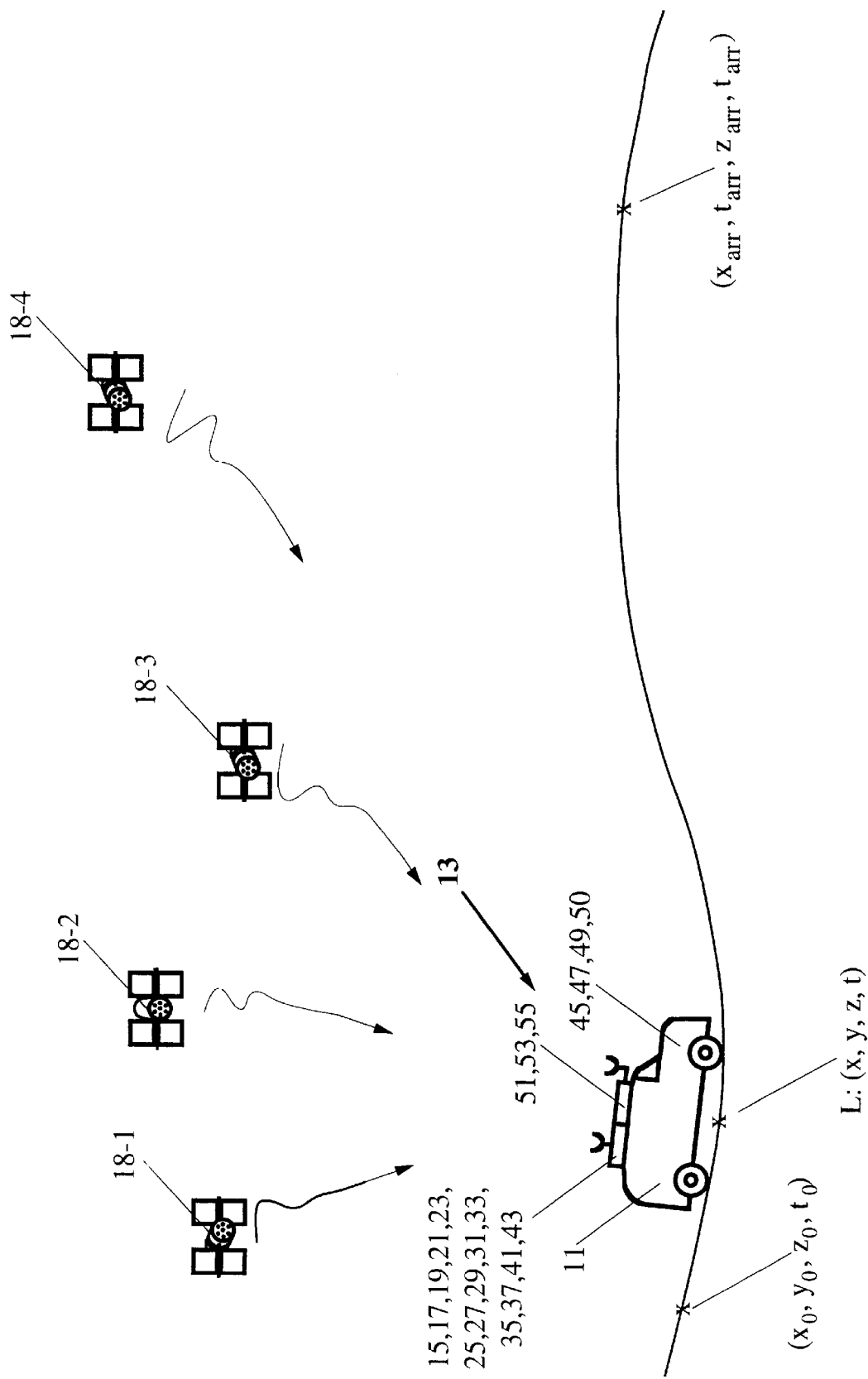
FIG. 1 illustrates an environment in which the invention can be used.

With reference to FIG. 1, a vehicle 11 carries a location determination (LD) system 13, such as a system that receives and processes GPS, GLONASS, LORAN or FM subcarrier signals. The LD system 13 includes an LD signal antenna 15 and an LD receiver/processor 17, and the LD receiver/processor has an associated electronic map or database 19, a clock or timer 21 that may be, but need not be, extremely accurate, a memory 23 and, optionally, a data entry device 25, a printer interface 27, a printer 29, a microphone 31, a microphone interface 33, a loudspeaker 35, a loudspeaker interface 37, an audible display 39, a visual interface 41, a visual display 43, an odometer/speedometer adjustment mechanism 45 that is optionally connected to the receiver/processor 17 and to one or both of an odometer 47 and/or a speedometer 49 that are mounted on the vehicle 11, and an optional supplemental odometer/speedometer display for the corrected odometer mileage and/or speedometer speed readings.

The "operational" items 13, 15, 17, 19, 21, 23, 25, 27, 29, 31, 33, 35, 37, 39, 41, 43, 45 and/or 46 may be part of a portable unit, such as a personal digital assistant (PDA) carried by a vehicle occupant, or some or all of these items may be mounted on the vehicle 11 and may be electronically connected to each other. The LD antenna 15 and the LD receiver/processor 17 receive and analyze LD signals from two or more LD signal sources 18-1, 18-2, 18-3, 18-4 that are preferably spaced apart from the vehicle 11.

If the operational items are part of a portable unit, the LD system 13 is powered up when the vehicle leaves a home base, or is always ON. When the LD system 13 and the clock 21, working together, sense that the vehicle has remained in one location for a time interval $\Delta t$ longer than a selected time increment $\Delta t1$ (e.g., $\Delta t1 = 60–240$ sec), —referred to as "vehicle arrest" here —the LD system determines the location of the LD antenna 15, with an associated inaccuracy that need not be smaller than about 10–30 meters. Preferably, however, the associated location inaccuracy is no more than about 3 meters.

The clock 21 may be part of the LD receiver/processor 17 and may determine the local or absolute time from analysis of the LD signals received. Alternatively, the clock 21 may be a separate or stand-alone timing device with an associated maximum cumulative inaccuracy that is no worse than 1–30 seconds per month.

A vehicle arrest spatial location $L=(x_{arr}, y_{arr}, z_{arr})$ determined by the LD unit 13 and the associated vehicle arrest observation time $t_{arr}$ (at which the location is determined during vehicle arrest) are noted and stored in the memory 23. Optionally, the town and/or county and/or state in which the vehicle arrest spatial location $(x_{arr}, y_{arr}, z_{arr})$ is found and/or the road or street intersection nearest to the vehicle arrest spatial location are determined by reference to the database 19 and are also stored in the memory 23 for later call-up and/or display.

At one or more user-selected times, or at predetermined times such as at the end of a 24-hour day or a seven-day week, the printer interface 27 interrogates the memory 23 and causes the printer 29 to print out a sequence of records, with each printed record optionally including: (1) the vehicle arrest location and the date and time or time interval at which vehicle arrest occurred; (2) additional relevant information, such as town, County, state and/or nearest street or road intersection associated with each vehicle arrest location (optional); (3) one or more measures of vehicle user performance, such as the length of each vehicle arrest time interval, or the amount or percentage of time vehicle arrest that occurs in a workday; and (4) the date, time and results of calibration of the vehicle odometer 47 and/or the vehicle speedometer 49.

The LD system 13 can periodically note the vehicle location (for example, at selected time intervals of 0.5–15 sec, or longer if desired) when the vehicle 11 is in motion and can also estimate and store the distance $\Delta d$ traveled from a preceding vehicle arrest spatial location to a subsequent vehicle arrest spatial location, using either the reading on the vehicle odometer 47, or a time integral of the speed registered on the vehicle speedometer 49, or a sequence of vehicle location coordinate samples determined by the LD unit 13. Information on the cumulative distance traveled can also be determined and stored and can be printed out by the printer 29. This approach provides the vehicle user or vehicle owner with a permanent, written, timely record of vehicle use during a workday or workweek or workmonth, with sufficient detail for income tax purposes, for monitoring vehicle use efficiency, or for mileage reimbursement purposes between vehicle arrest locations $(x_{arr}, y_{arr}, z_{arr}, t_{arr})$. This approach also provides monitoring of, and distinguishing between, the personal travels and the business-related travels of a vehicle user, for example by the user's employer.

Optionally, the LD system 13 also supplements, serves as or replaces the vehicle odometer 47, or serves to calibrate and monitor the performance of the odometer 47 and/or the speedometer 49. In a first approach, the LD system 13 is programmed (1) to determine its own spatial location coordinates $(x(t_i), y(t_i), z(t_i))$ at each of a sequence of approximately uniformly spaced times $\{t_i\}_i$ and to determine cumulative distance $\Delta d1(t_0;t_k)$ traveled after a selected initial time $t_0$ by a relation such as $$\Delta d1(t_0;t_k) = \sum_{i=1}^{k} [(x(t_i) - x(t_{i-1}))^2 + (y(t_i) - y(t_{i-1}))^2 + (z(t_i) - z(t_{i-1}))^2]^{1/2}, \quad (1)$$

and to use the cumulative $\Delta d1(t_0;t_k)$ as a substitute for, or supplement to, a conventional odometer mileage reading or speedometer reading. In a second approach, the LD system compares the cumulative distance $\Delta d1(t_0;tk)$ with a conventional odometer and/or speedometer reading and optionally adjusts the odometer and/or speedometer reading, or indicates an adjustment that is required, so that any discrepancy between the LD unit reading and the odometer or speedometer reading is reduced or minimized, by reducing the absolute value or magnitude of the difference. Use of a sequence of approximately uniformly spaced times here may be replaced by use of a sequence of adaptively determined times $\{t'_j\}_j$ where $t'_j$ may be determined from $t'_{j-1}$ by the requirement that the incremental distance $$\Delta d1(t'_{j-1};t'_j) = [(x(t'_j) - x(t'_{j-1}))^2 + (y(t'_j) - y(t'_{j-1}))^2 + (z(t'_j) - z(t'_{j-1}))^2]^{1/2}, \quad (2)$$

measured by the LD system 13 be approximately, or at most, equal to a selected threshold distance $\Delta d_{thr}$, such as 1–10 meters.

Figure 2:
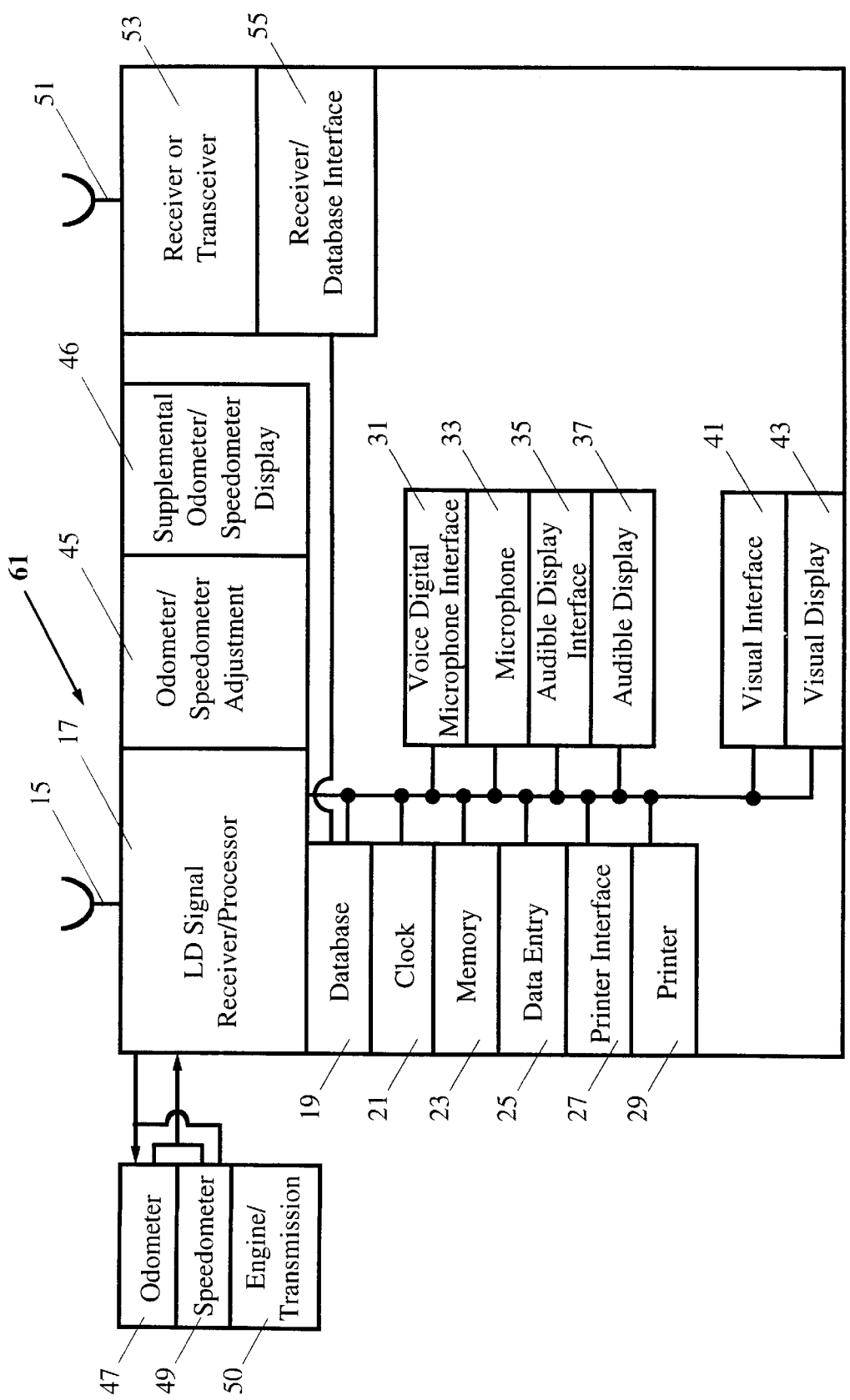
FIG. 2 is a schematic view of apparatus that can be used to practice the invention.

FIG. 2 is a schematic view of apparatus 61, which can be vehicle-mounted or portable, suitable for practicing the invention. The apparatus 61 includes an LD unit 13 that includes an LD signal antenna 15 and an LD signal receiver/processor 17. The LD receiver/processor 17 has an associated electronic map or database 19, a clock or timer 21, a memory 23, and, optionally, a keyboard or other data entry device 25, a printer interface 27, a printer 29, a microphone interface 31, a microphone 33, an audible display interface 35, a loudspeaker or other audible display 37, a visual display interface 41, a visual display 43, an odometer/speedometer adjustment mechanism 45, and an optional supplemental odometer/speedometer display 46. If an audible display 37, such as a loudspeaker, is used here, the audible display interface 35 includes a digital signal-to-voice signal converter that produces a voice signal to communicate relevant information to the vehicle user. As noted above, the "operational" items 13, 15, 17, 19, 21, 23, 25, 27, 29, 31, 33, 35, 37, 41, 43, 45 and/or 46 of the apparatus 61 may be part of a portable unit, such as a PDA carried by a vehicle occupant, or may be mounted on or in the vehicle 11 (FIG. 1) and electronically connected to each other.

Optionally, a vehicle odometer 47 and/or a vehicle speedometer 49 is electronically or mechanically connected to the LD receiver/processor 17 to provide odometer readings and/or speedometer readings at selected times when the location of the LD antenna 15 is determined. Whether or not the LD receiver/processor 17 is connected to the vehicle odometer 47 or to the vehicle speedometer 49, the LD unit 13 itself can provide an estimate of the distance increment an odometer should read, or of vehicle speed a speedometer should read, in moving from a first vehicle arrest location to a second vehicle arrest location, using samples of location coordinates and observation times for a sequence of locations along the route from the first vehicle arrest location to the second vehicle arrest location.

In one embodiment, the operational items are mounted on the vehicle 11, and the LD system 13 and clock 21 are attached to the vehicle engine and/or transmission 50. Each time the vehicle engine is activated or the vehicle transmission is engaged or the LD system 13 is activated, the LD system determines the spatial location coordinates of the LD antenna 15 and the observation time the engine or transmission or LD system is activated and stores this information in the memory 23. Each time the engine or transmission 50 or the LD system 13 is deactivated, or (optionally) each time the vehicle remains at a location for a time interval of length greater than a selected time interval length $\Delta t1$ ($\geq 60-240$ sec), with or without power-down, the LD system again determines the LD antenna spatial location and the observation time and stores this information in the memory 22. At selected or predetermined times, the power-up spatial location, power-up time, powerdown spatial location and power-down time are printed out in a chosen format or are audibly presented to a vehicle user, similar to the first embodiment. Optionally, the location of the LD antenna 15 at each vehicle arrest time $t_{arr}$ can be stated in latitude/longitude/altitude or by reference to nearby street or road intersections contained in the database 19. Optionally, the vehicle user can enter information on a vehicle arrest event into the LD receiver/processor 17 and/or into the database 19, using the data entry module 19 (e.g., a keyboard) or the microphone 33. If the microphone 33 is used for entry of vehicle arrest information, the microphone interface 31 converts the voice signals to digital signals that can be processed and stored in the memory 23, in a manner well known in the art.

Handheld devices for converting voice signals to digital form, or from digital form to voice, and storing these signals are now available widely. For example, The Sharper Image Catalog, San Francisco, October 1996, pages 29, 41, 71 and 84 (back cover) displays and lists features available for the Total Recall 23, the Voice Pager Organizer, the Memo Manager and the Machina Cardcorder 6000 devices, respectively, all of which perform such conversions and provide other features as well.

Any of the operational items 13, 15, 17, 19, 21, 23, 25, 27, 29, 31, 33, 35, 37, 41, 43, 45 and/or 46 may be built into the vehicle 11 as original vehicle equipment (preferably on or adjacent to the vehicle dashboard) or may be retrofitted onto the vehicle as an after-market device. Alternatively, some or all of these operational items may be contained in a PDA or other handheld apparatus 59, shown in FIG. 3A, that is either left in the vehicle 11 or is carried by a vehicle user. The PDA 59 may include some or all of the components included in the apparatus 61 shown in FIG. 2.

Figure 3B:
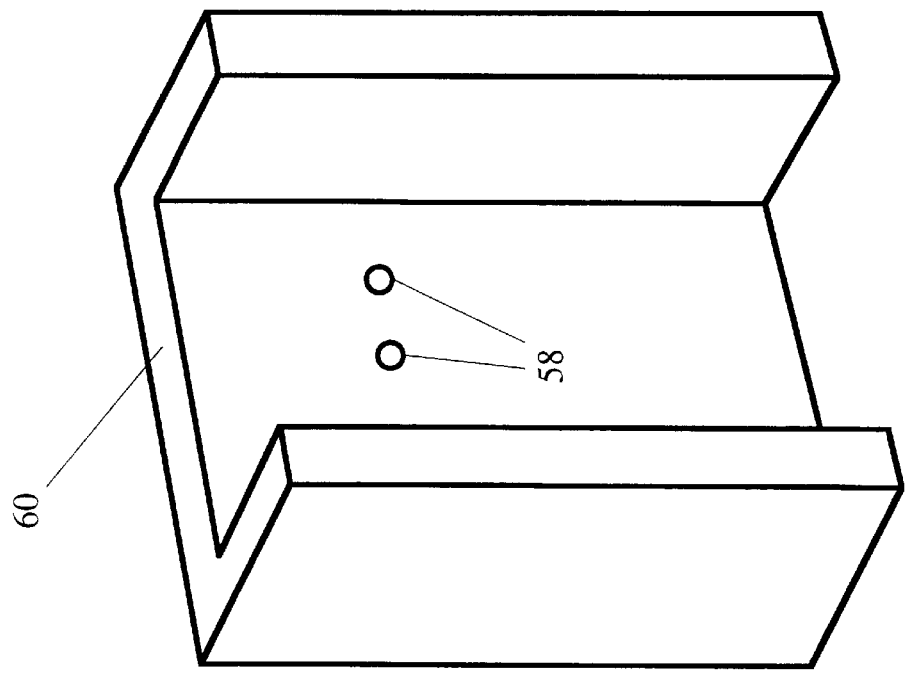
FIG. 3A illustrates a handheld personal digital assistant (PDA) that is received by an electronic cradle, shown in FIG. 3B.
Figure 3A:
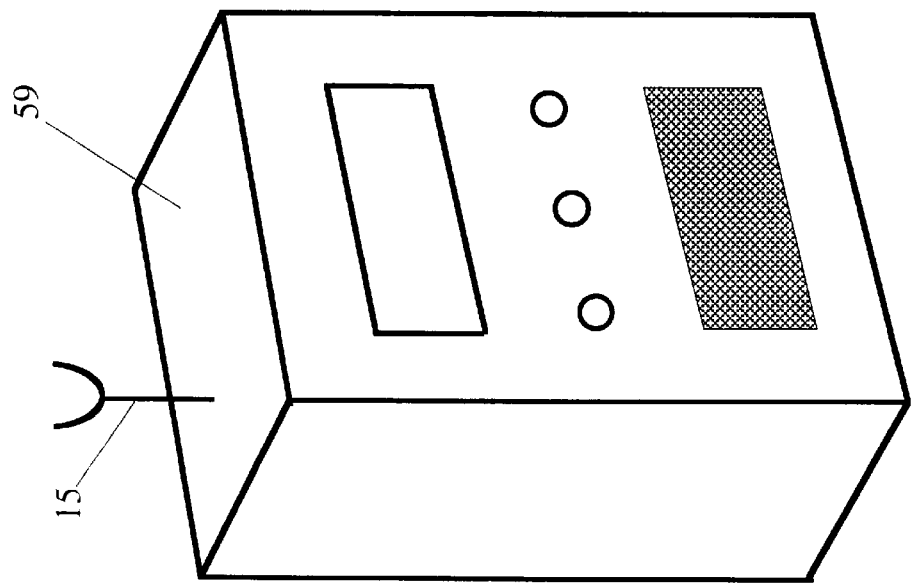

The PDA 59 is optionally received by an electronic cradle 60, shown in FIG. 3B, mounted within the occupant compartment of the vehicle 11 that optionally connects to the vehicle odometer 47 and/or to the vehicle speedometer 49 and/or to any of the operational items that are mounted on the vehicle. For example, the PDA 59 may include the LD receiver/processor 17, and the LD antenna 15 may be mounted on or in the vehicle 11. When the PDA 59 is connected into the electronic cradle 60, an electronic connection 58 is established between the LD antenna 15 and the LD receiver/processor 17. Alternatively, but less attractively, the PDA 59 may include the LD receiver/processor 17, and the LD antenna may be mounted on the vehicle 11, with the electronic cradle 60 receiving the PDA and establishing the electronic connection.

In another approach, the PDA 59 may communicate with the vehicle odometer 47, with the vehicle speedometer 49 and/or with one or more operational items mounted on or in the vehicle 11 by means of a short range radio link, such as infrared signals, as discussed later in connection with FIGS. 4 and 5.

In an alternative embodiment, locations for anticipated vehicle arrest stops for a vehicle can be entered into the database 19 each day, and can also be entered on-the-fly by use of radio waves transmitted from a central station to a radio antenna 51, a radio receiver or transceiver 53 and a radio-database interface 55 carried on the vehicle 11 (FIG. 1) and connected to the database 19. When vehicle arrest occurs, the LD system 13 optionally checks the vehicle arrest location against the distance d from each of a list of pre-entered, anticipated vehicle arrest locations for that time period. If this distance is no greater than a selected threshold distance (e.g., 10–30 meters), the system concludes that this particular vehicle arrest stop was, in fact, made. This approach provides a check on whether all pre-entered vehicle arrest stops were made in a given time period.

The LD system 13 may use, but need not use, differential LD techniques, such as differential GPS or differential GLONASS signals, discussed in U.S. Pat. No. 4,751,512 issued to Longaker, differential LORAN signals, discussed in U.S. Pat. No. 5,045,861 issued to Duffet-Smith, or differential FM subcarrier (phase correction) signals, discussed in U.S. Pat. No. 5,477,228 issued to Tiwari et al.

Optionally, the apparatus 61 in FIG. 2 also includes a radiowave antenna 51 connected to a radiowave receiver or transceiver 53, which is connected to a receiver/database interface 55, for receiving, on-the-fly instructions and additional information on vehicle arrest locations. The receiver/database interface 55 is connected to the database 19 in order to deposit these on-the-fly instructions, and the corresponding locations, in the database to be processed and acted upon by the LD receiver/processor 17.

Figure 4:
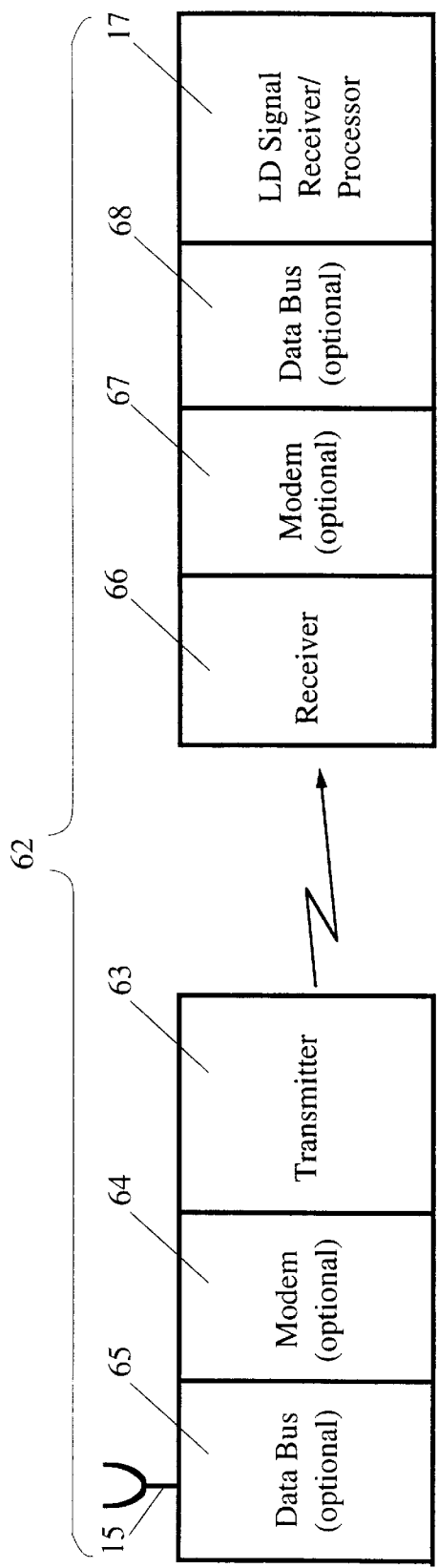
FIGS. 4 and 5 are schematic views of short range communication link apparatus that can be used to practice a portable embodiment of the invention.

In an alternative embodiment, an LD signal antenna 15 is mounted on or in the vehicle 11 and communicates with a handheld or portable LD signal receiver/processor 17, using a short range, wireless communications link 62 that connects the LD antenna 15 and the LD receiver/processor 17, as illustrated in FIG. 4. The communications link 62 includes a transmitter 63, a modem 64 (optional) and a data bus 65 (optional) connected to the LD signal antenna 15, and includes a receiver 66, a modem 67 (optional) and a data bus 68 (optional) connected to the LD signal receiver/processor 17. The LD signal information transmitted by the transmitter 63 and received by the receiver 66 may be low intensity infrared or radiowave signals that need not travel more than 1–20 feet (0.3–6 meters).

Figure 5:
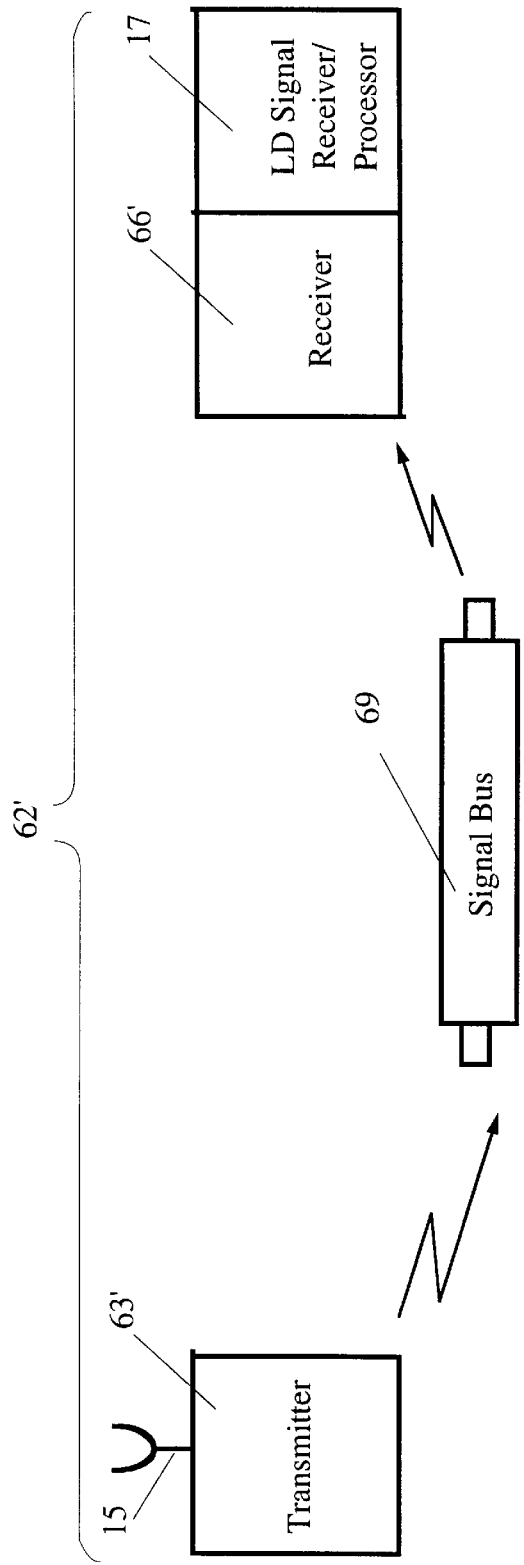

Optionally and alternatively, the communications link 62 may also include a signal bus 69 that (1) is separated from the LD antenna 15 and from the LD receiver/processor 17, (2) that receives LD signal information from the transmitter 63 and (3) that provides this LDS signal information for the receiver 66, as shown in FIG. 5.

A similar short range communications link can also be provided between the radiowave receiver or transceiver 53 and the database 19 or the receiver/database interface 55.

Standards for signals transmitted by signal buses are set forth in the Joint Society of Automotive Engineers and TMC (organization name unknown) publications for J1587 (issued as Jan. 1988 and in revised form as Jan. 10, 1994 and later revisions) and for J1708 (issued as Jan. 1986 and in revised form as Nov. 5, 1990 and later revisions), incorporated by reference herein. The J1587 and J1708 publications recite standards and define signal formats for use of microcomputer systems in heavy duty vehicle applications, such as provision of electronic data on vehicle and component performance, vehicle routing and scheduling, vehicle driver information and vehicle cargo information. Each signal that is transmitted using a signal bus complying with these standards includes (1) a message identification (MID) no. (three digits, from 0–255), with MIDs 0–127 being defined in J1708 and MIDs 128–255 being defined in J1587, (2) one or more measured parameter values associated with and identified by the MID and (3) a checksum. The current set of 256 MIDs, including MID numbers held in reserve, is set forth in the J1587 document. Parameter update time intervals and priorities for transmission of different groups of MIDs are now being developed.

A communications bus (CB) is useful in delivering data and other electronic signals from one device to another on a vehicle. Without use of such a bus, as the number of vehicle devices increases, duplication of vehicle sensors and increasing use of point-to-point wiring between devices is required, which can result in large and needlessly complex wiring looms. Use of a CB allows use of unduplicated vehicle sensors and minimizes use of point-to-point wiring, by making all measurements and signals available simultaneously to all devices that are connected by the bus. Some standards for communication buses are set forth by the joint Society of Automotive Engineers (SAE) and International Organization for Standardization (ISO). For example, Controller Area Network (CAN) in ISO 11519.1–11519.4:1994, for low speed applications.

The user segment components of a GPS carried on a vehicle are connected using a communications bus in the same manner as are otherdevices on the bus. An electrical connection between the device and the bus is made using interface circuitry that complies with applicable standards. Inexpensive interface ICs are readily available for buses that conform to the CAN standards. Typically, each device that is part of a GPS user segment on a vehicle will have a unique CB address. GPS data can be provided or delivered in two ways. First, a GPS user segment device can provide vehicle location, vehicle velocity and/or absolute or local time information for use on the vehicle, using packets that identify the source and destination(s) of such data on the bus and that identify the type of data (location, velocity, time) contained in the packet.

Figure 6A:
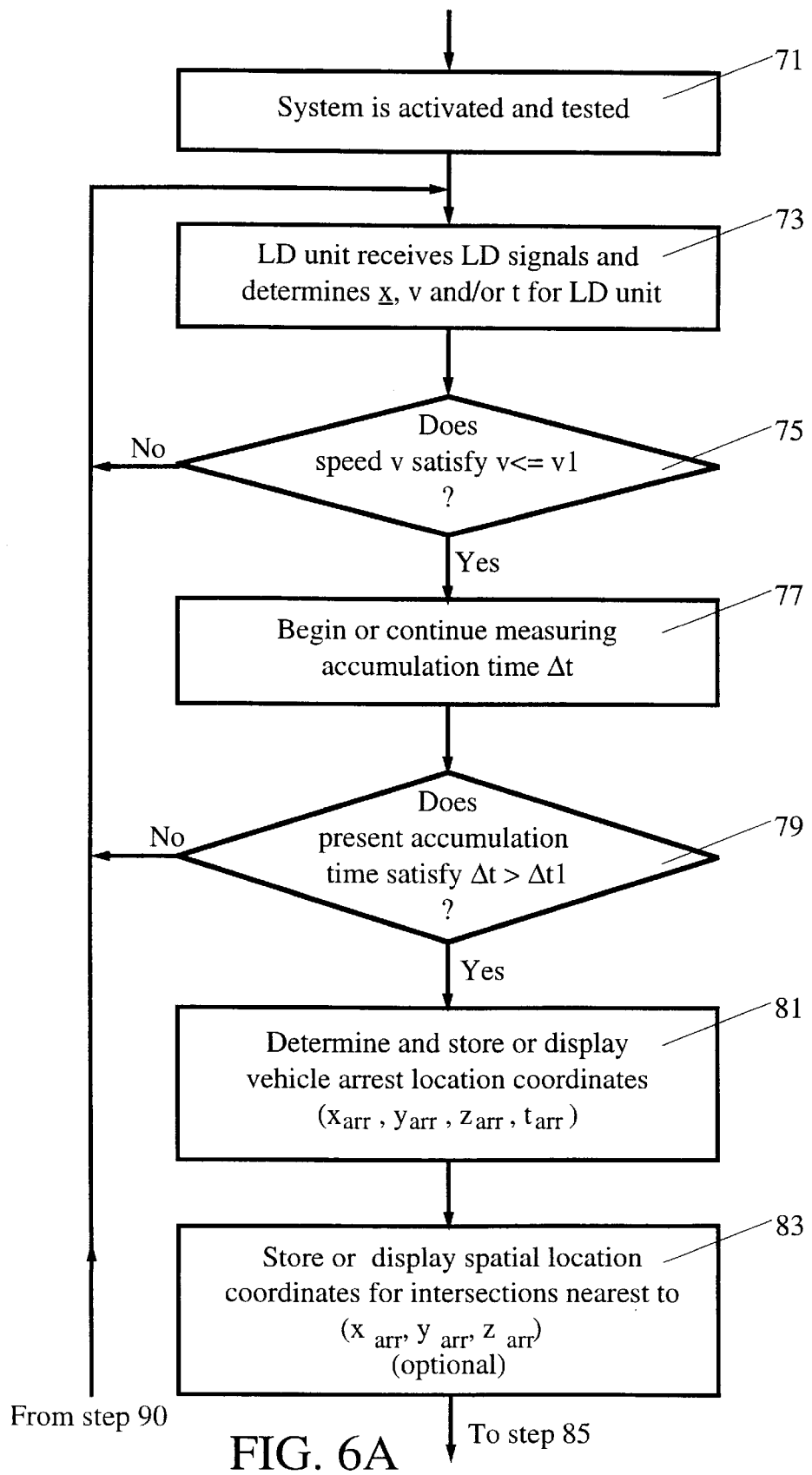
FIGS. 6A/6B and 7 present flow charts of procedures for practicing embodiments of the invention.
Figure 6B:
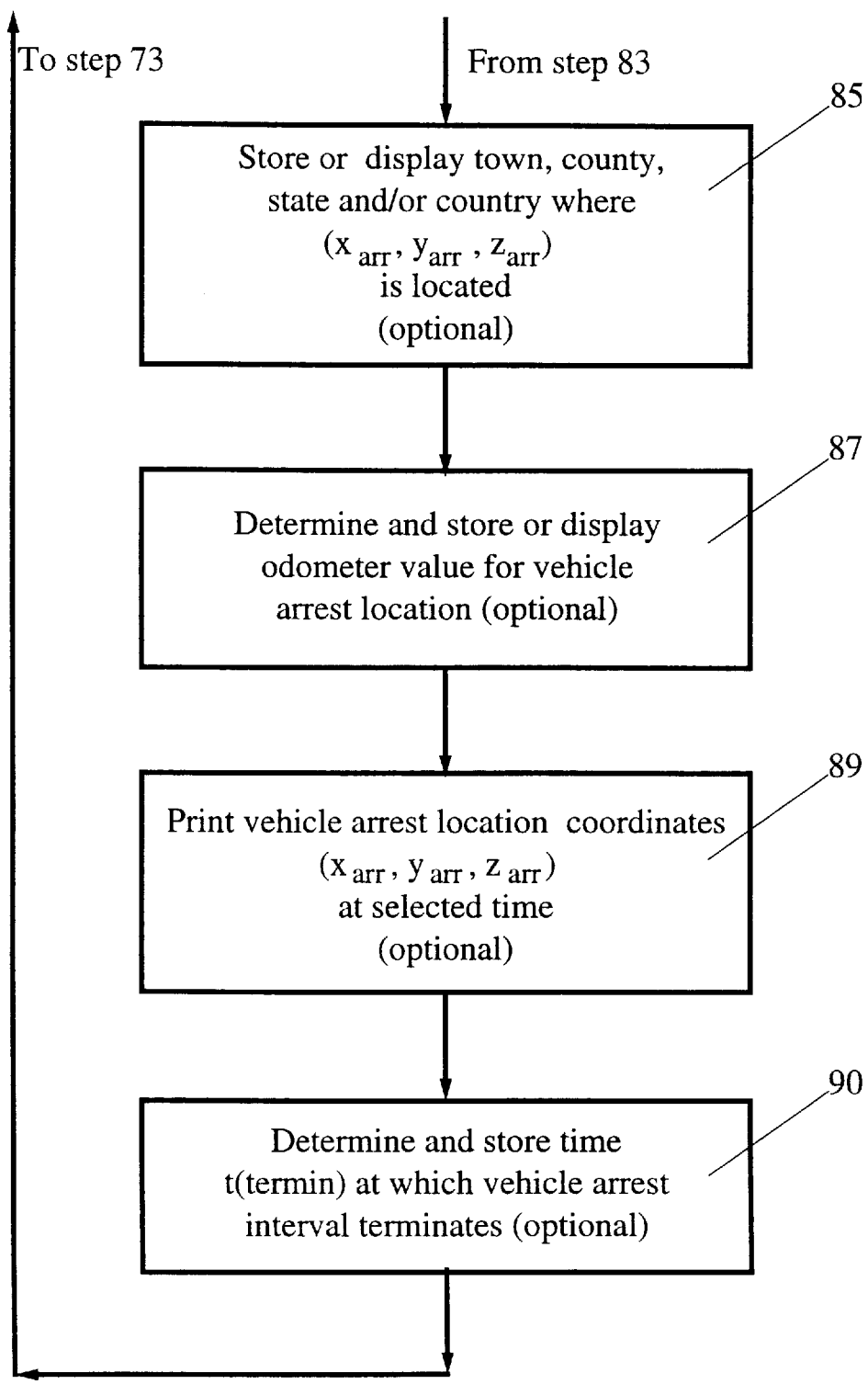

Second, the GPS data can be provided at a central server for such data, and any device requiring such data addresses a data request to the GPS client server. The server then packages the requested data in a packet, frame or other suitable format and sends the packaged data directly to the requesting device, using the CB. This approach is more flexible in that it (1) allows the client to request and promptly receive GPS data and non-GPS data, (2) allows data to be requested and received only when such data are needed, rather than transporting all data on the bus CB as soon as such data are available, regardless of need, and (3) provision of such data in more convenient formats for client use. Related GPS data may include GPS receiver health, GPS receiver correction status, vehicle tracking status and other similar information. Information can also be provided to, and stored on, the client server to improve or correct the GPS receiver performance. Such information may include real time clock information, to reduce the time required for initial acquisition or reacquisition of GPS satellite signals, and may include DGPS correction data to improve the accuracy of real time determination of vehicle present location. FIGS. 6A and 6B present a flow chart illustrating an embodiment of the invention. In step 71, the vehicle user activates and tests the apparatus 61, or the associated system. In step 73, the LD unit 13 receives LD signals and determines the present location coordinates (x,y,z) of the LD unit (i.e., location of the LD antenna 15) and the present speed v (magnitude of the velocity vector) of the LD unit 13. Vehicle speed may be determined using the LI) unit 13 or, optionally, using a vehicle speedometer 49.

In step 75, the system inquires whether the speed v satisfies v ≦v1, where v1 is a selected positive threshold speed? If the answer to the question in step 75 is "no," the system recycles to step 73 or, optionally, moves to step 91. The threshold speed may be set at some low speed, such as 10–30 cm/sec, which will recognize a true vehicle arrest (v+0) and will also recognize a situation in which vehicle speed is very small but not quite zero because of perturbations in the LD signals received and processed. If the answer to the question in step 75 is "yes," the system uses a clock and either begins measuring, or continues to measure, the cumulative length Δt of an accumulated, continuous time interval during which v≦v1, in step 77.

In step 79, the system inquires if Δt>Δt1, a selected positive threshold time, which is preferably between 30 and 240 sec. If the answer to the question in step 79 is "no," the system recycles to step 73. If the answer to the question in step 79 is "yes," the system determines that a true vehicle arrest has occurred, and the system queries the LD unit 13 to determine the present vehicle arrest location coordinates ($x_{arr}$, $y_{arr}$, $z_{arr}$, $t_{arr}$) and stores and/or displays these coordinates, in step 81. Optionally, the vehicle arrest spatial location coordinates ($x_{arr}$, $y_{arr}$, $z_{arr}$) are compared with spatial location coordinates for intersections of nearby roads and/or streets, and the nearest intersection can be identified and stored and/or displayed together with the vehicle arrest location coordinates ($x_{arr}$, $y_{arr}$, $z_{arr}$, $t_{arr}$), in step 83. Optionally, the town, county, state and/or country in which the vehicle arrest spatial location coordinates ($x_{arr}$, $y_{arr}$, $z_{arr}$) are also determined and stored and/or displayed, in step 85. Optionally, the odometer value is also read out and stored and/or displayed whenever true vehicle arrest occurs, in step 87. The system then may recycle to step 73. The vehicle arrest information is optionally printed out at a selected time, such as the end of a workday, a workweek or a workmonth, in step 89.

In step 90, the system optionally determines and stores the time t=t (termin) at which vehicle speed v first increases above v=v1, when a vehicle arrest interval terminates. The system recycles to step 73.

A print-out of the vehicle arrest information preferably includes the following items: (1) the date of each vehicle arrest event; and (2) the spatial location coordinates ($x_{arr}$, $y_{arr}$, $z_{arr}$) or other suitable location indicia for each vehicle arrest event; (3) the (initial) time $t_{arr}$ at which each vehicle arrest begins and the length of time (=t(termin)−$t_{arr}$) consumed by a vehicle arrest event. Optionally, the print-out may include additional relevant information that may be entered by the vehicle user, using the data entry device 25. The data entry device 25 may be a conventional keyboard, a "reduced" keyboard with relatively few keys or switches to enter (only) the vehicle trip category and/or other essential information, or an audible data entry device, such as a voice recorder and voice-to-digital conversion module.

In another embodiment of the invention, the odometer 47 and/or the speedometer or tachometer 49 for the vehicle 11 is calibrated. In a first approach, an initial odometer reading or vehicle location is noted and stored when the vehicle is at an initial location. The vehicle 11 need not be motionless as it passes this initial location. Vehicle speed is preferably noted and stored as the vehicle passes, or leaves, the initial location. The vehicle 11 then travels to a selected final location, and an odometer reading $d(t_0;t_f)$ from the instrument 47 (FIG. 2) is sensed and optionally stored. The LD unit-based cumulative distance $\Delta d1(t_0;t_f)$, defined in Eq. (1) with $t_k=t_f$, is also determined and optionally stored, and a first error ratio $$\epsilon 1 \ 100 \times [d(t_0;t_f) - \Delta d1(t_0;t_f)] / \Delta d1(t_0;t_f), \quad (3)$$

is computed and used to calibrate the odometer 47. The error ratio $\epsilon 1$ provides a percentage error in which the signum of the error indicates that the speedometer is running fast (slow) against the odometer if $\epsilon 1$ is positive ($\epsilon 1$ is negative). If, for example, the odometer 47 is running high relative to the LD) unit (which is assumed to provide accurate readings) by 3.5 percent, the vehicle operator may wish to decrease the odometer reading difference between two locations by a fraction of (0.035)/(1+0.035)–0.0338 or about 3.4 percent. Such a difference may introduce significant errors for a trip covering several tens or hundreds of miles.

In an alternative first approach, a second LD unit-based measure $$\Delta d2(t_0;t_f) = \int_{t_0}^{t_f} v(t') dt' \quad (4)$$

of the cumulative distance traveled is determined, using the measured speed $v(t_i)$ of the LD unit at a sequence of selected sampling times $\{t_i\}_i$. Simpson's rule, the trapezoid rule or any other suitable numerical integration technique can be used to estimate the time integral in Eq. (4). An alternative first error ratio $$\epsilon 1' = 100 \times [d(t_0;t_f) - \Delta d2(t_0;t_f)] / \Delta d2(t_0;t_f) \quad (5)$$

is computed and used to calibrate the odometer.

The odometer can be corrected, based on the non-zero value of the ratio $\epsilon 1$ or $\epsilon 1'$, by dividing the odometer reading by the quantity (1+E1/100), where E1=$\epsilon 1$ or $\epsilon 1'$; that is, $$d(t_0;t_f)_{corr} = d(t_0;t_f) / (1+E1/100). \quad (6)$$

This numerical correction can be implemented by dividing the analog or digital signal representing the odometer reading $d(t_0,t_f)$ by the quantity (1+E1/100) before this reading is displayed, discretionarily, periodically or at all times, on a supplemental odometer display 46 (optional) indicated in FIG. 2. This odometer calibration and correction can be implemented as often as the vehicle user wishes, by computing and re-entering a new quantity (1+E1/100) for the odometer display 46, using an odometer/speedometer adjustment module 45 that relies on appropriate hardware or software. A hardware implementation of odometer (or speedometer) correction may use a multiplier circuit that multiplies the uncorrected distance $d(t_0;t_f)$ by the factor $(1+E1/100)^{-1}$, or may use bit stuffing or bit removal to correct the odometer (or speedometer) reading. These approaches are also implementable in software. Alternatively, the vehicle 11 and LD system 13 can be configured so that the odometer (or speedometer) calibration and correction is performed automatically, either at selected time intervals, at selected odometer readings, or at all times.

In a second approach, used to calibrate the speedometer 49, the vehicle passes an initial location (at $t=t_0$) at a speed of $v=v^{\wedge}$ and maintains this speed as nearly as possible until the vehicle passes a final location (at $t=t_f$). The vehicle operator or the system also records the time $\Delta t_{0f} = t_f - t_0$ required to cover the distance between the initial and final locations. An LD unit-based measure of the cumulative distance traveled, $\Delta d1(t_0;t_f)$ or $\Delta d2(t_0;t_f)$, is determined, and an average velocity $$v(\text{avg};j) = \Delta dj(t_0;t_f) / \Delta t_{0f} (j=1,2) \quad (7)$$

is computed. A second error ratio $$\epsilon 2 = 100 \times [v^{\wedge} - v(\text{avg};1)] / v(\text{avg};1) \quad (8)$$

or an alternative second error ratio $$\epsilon 2' = 100 \times [v^{\wedge} - v(\text{avg};2)] / v(\text{avg};2) \quad (9)$$

is then computed and used to calibrate the speedometer. The second error ratio, $\epsilon 2$ or $\epsilon 2'$, may vary with the speed $v=v^{\wedge}$ used for the test and calibration, and it is preferable that the speedometer be calibrated using two or more different test speeds $v=v^{\wedge}$. The second error ratio, $\epsilon 2$ or $\epsilon 2'$, will be positive (negative) if the speedometer 49 is reading high (reading low). If, for example, $\epsilon 2=0.042$ so that the speedometer is reading high, the vehicle operator may wish to increase his or her speed, as indicated by the vehicle speedometer, by a fraction of up to (0.042)/(1−0.042)= 0.0438 or about 4.4 percent, consistent with any applicable vehicle speed limits that apply.

In another alternative second approach, the LD unit determines the vehicle speed $v(t_i)$ at a sequence of selected sampling times $t_i$ and determines an average vehicle speed $v(\text{avg})$ for the time interval $t_0 < t < t_f$. An LD unit-based average vehicle speed may be determined by $$v(\text{avg};3) = \int_{t_0}^{t_f} v(t') dt' / (t_f - t0), \quad (10)$$

or by $$v(\text{avg};3) = \sum_{i=0}^{N_f} v(t_i), \quad (11)$$

where $N_f$ is the number of time samples used in the sum, or by any other suitable definition. An alternative second error ratio $$\epsilon 2'' = [v^{\wedge} v(\text{avg};3)] / v(\text{avg};3) \quad (12)$$

is then computed and used to calibrate the speedometer 49.

The speedometer is corrected, based on the non-zero value of the ratio $\epsilon 2$ or $\epsilon 2''$ or $\epsilon 2''$, by dividing the speedometer reading by the quantity (1+E2/110), where E2=$\epsilon 2$ or $\epsilon 2'$ or $\epsilon 2''$; that is, $$v^{\wedge}_{corr} = v^{\wedge} / (1+E2/100). \quad (13)$$

This numerical correction can be implemented by dividing the analog or digital signal representing the speedometer reading $v^{\wedge}$ by the quantity (1+E2/100) before this reading is displayed on a supplemental speedometer display 46 (optional) indicated in FIG. 2. This speedometer calibration and correction can be implemented as often as the vehicle user wishes, by computing and re-entering a new quantity (1+E2/100) for the speedometer display. Alternatively, the vehicle 11 and the LD system 13 can be configured so that the speedometer calibration and correction is performed automatically, either at selected time intervals or at selected odometer readings.

If the signal that drives the odometer 47 and/or speedometer 49 is digital, rather than being fed directly and mechanically from a vehicle wheel, this drive signal can be divided by the quantity (1+E1/100) or (1+E2/100) before being displayed on the regular vehicle display, and the supplemental odometer/speedometer display 46 is not needed.

An odometer and a speedometer used on a vehicle are usually tied together mechanically and/or electronically so that it is often sufficient to calibrate just one of these two instruments. However, because vehicle tire pressure can vary by several percent from one circumstance to another, odometer readings and speedometer readings may both differ from true mileage or true speed, respectively, by several percent.

As noted above, the odometer function and/or the speedometer function for the vehicle can be calibrated by sampling LD signals at a sequence of (preferably closely spaced) times $\{t_i\}$ use of these LD signals to determine the vehicle location or location coordinates $L(t_i)$ at the time $t=t_i$, and use of this sequence of locations to estimate an incremental distance moved $\Delta d(t_i;t_{i+1})$ and/or to estimate vehicle speed v in the time interval $t_i<t<t_{i+1}$. A conventional odometer will typically receive about 2,000 pulses per mile, or one pulse every 2.64 feet (90.47 cm), as the vehicle wheels turn and the vehicle moves. A location determination (LD) system such as the GPS will receive LD signals continually and will typically recalculate the LD unit location every 0.6 seconds. The length of this GPS time increment can probably be reduced to as low as 0.2 seconds, which corresponds to a distance increment of 13.2 feet (402.34 cm) for a vehicle moving at 45 miles per hour or 72.42 km per hour. For a vehicle speed of greater than (or less than) 9 miles per hour or 14.48 km per hour, a conventional odometer (or an LD system) will typically provide a greater number of locations per vehicle mile moved, if each odometer pulse registers on a display. However, a conventional odometer will more typically display accumulated vehicle mileage in tenths or hundredths of a mile, which correspond to distance increments of 528. feet (16093 cm) and 52.8 feet (1609.3 cm), respectively.

A conventional speedometer may use the same 2,000 pulses per mile to determine present vehicle speed v but may display the computed speed quasi-continuously through use of (partly) analog circuits. A conventional odometer and a conventional speedometer rely in part on mechanical connections and thus may experience mechanical hysteresis, mechanical wear problems and variations due to tire pressure fluctuations. Use of an LD unit, by comparison, to estimate distance increments $\Delta d(t_i;t_i+1)$ and present vehicle speed $v(t)$ in a time interval $t_i \leq t \leq t_{i+1}1$ can provide a finer grained time sampling for both distance increment $\Delta d(t_i;t_{i+1})$ and for present vehicle speed v; but the LD signals may be affected by the presence of extreme atmospheric disturbances, such as electrical storms. However, use of the LD signals seems preferable here, because presence of extreme atmospheric disturbances is much less probable than presence of hysteresis, mechanical wear problems and/or variations due to tire pressure fluctuations.

Figure 7A:
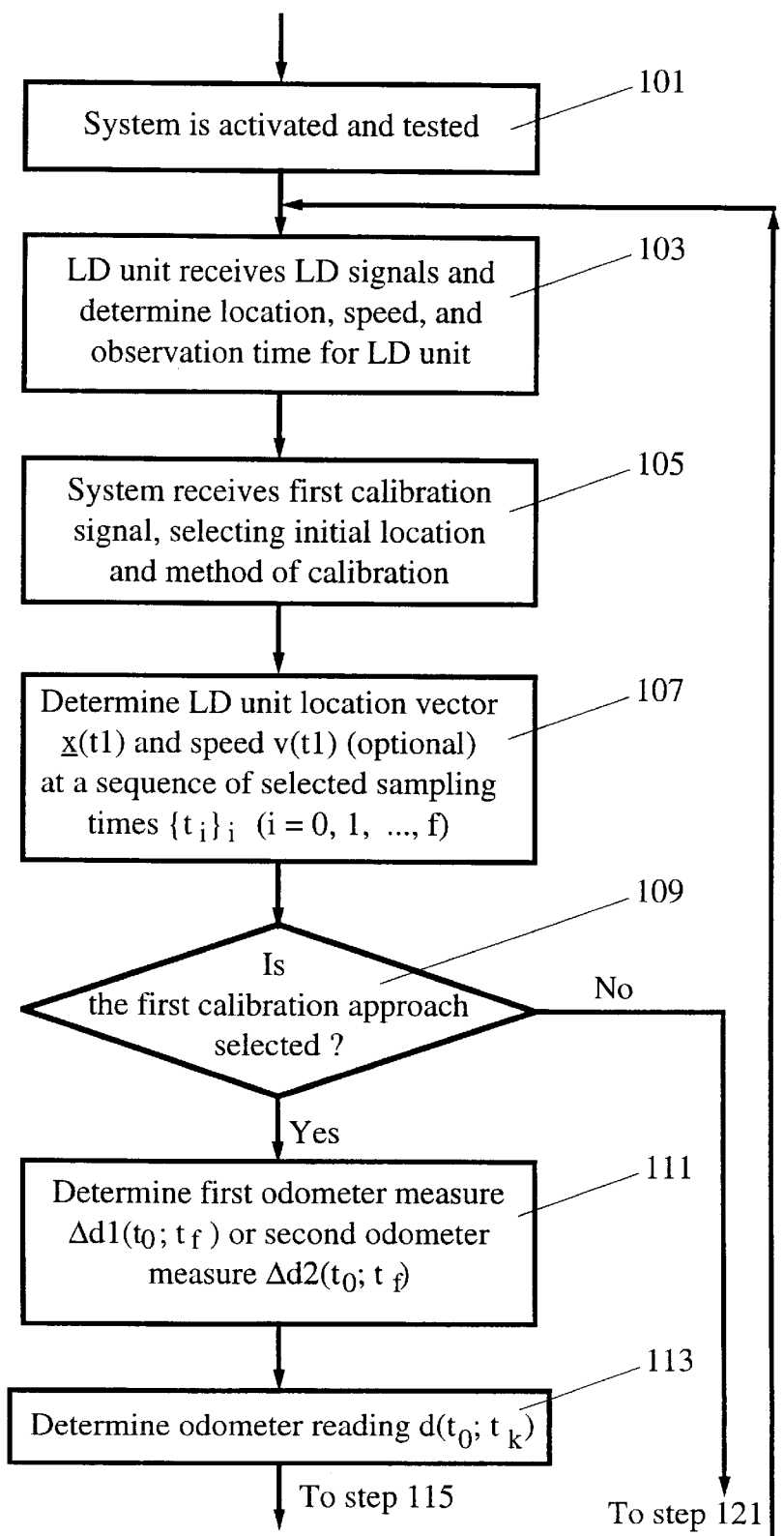
Figure 7B:
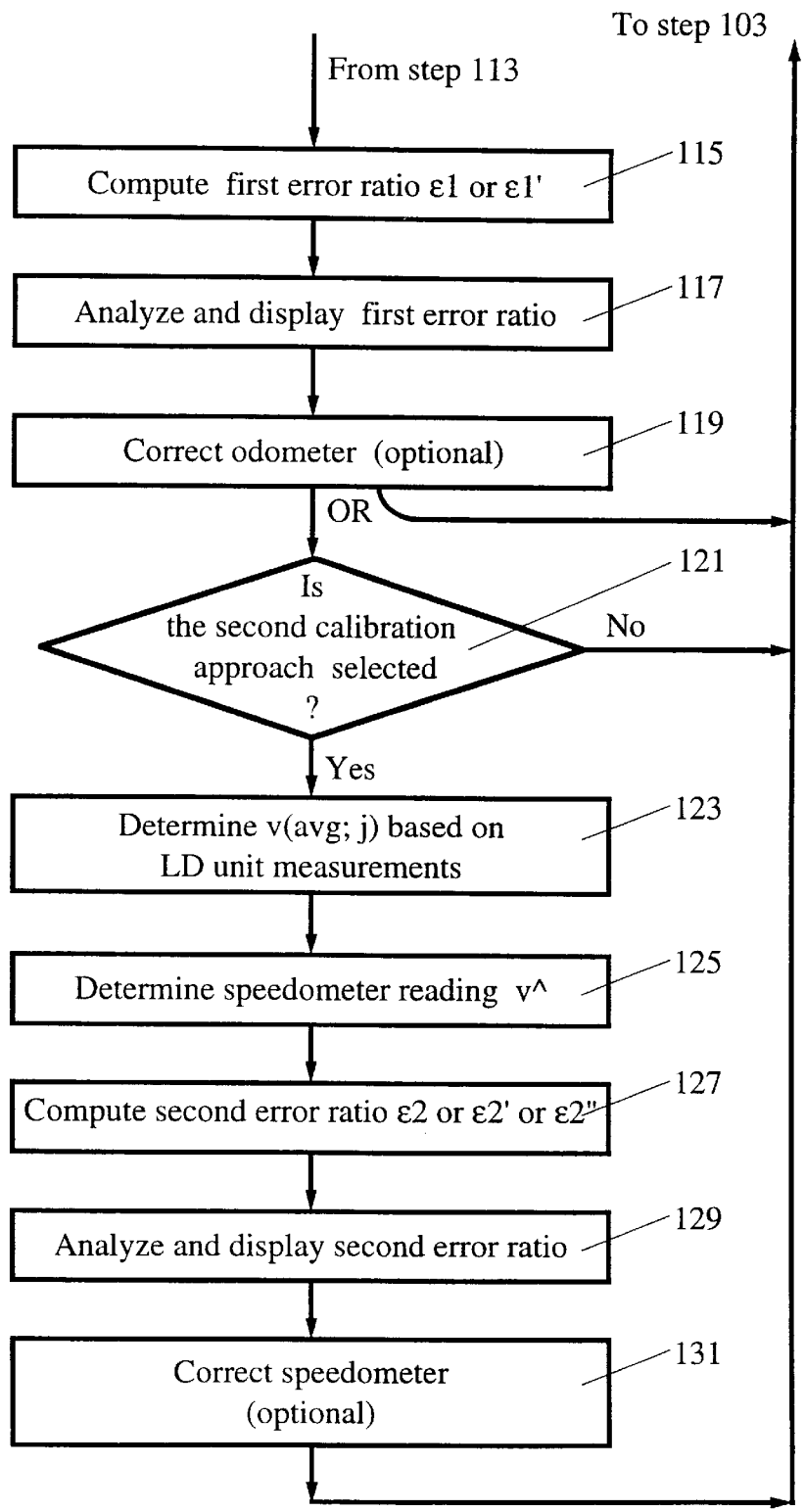

FIG. 7 presents a flow chart illustrating calibration according to the invention. In step 101, the system is activated and tested to verify that the system is operational. In step 103, the LD unit receives LD signals and determines the present location vector or location coordinates $x(t)$ and the present speed $v(t)$ of the vehicle as a function of the observation time t. In step 105, the system receives a first calibration notification signal indicating that the present location, $x(t_0)$, of the LD unit (taken as the present location of the vehicle) is to be used as an initial location for calibration and selecting a method of calibration. In step 107, the LD unit determines its location vector $x(ti)$ and, optionally, the vehicle speed $v(t_i)$ at each of a sequence of selected sample times $\{t_i\}$, $(i=0, 1, 2, \ldots, f)$. The system then determines, in step 109, if the first calibration approach is to be used, in which the odometer is calibrated against the LD unit.

If the answer to the inquiry in step 109 is "yes," in step 111 the LD unit or an associated microprocessor determines the first measure $\Delta d1(t_0;t_f)$, defined in Eq. (1), or the second measure $\Delta d2(t_0;t_f)$, defined in Eq. (4), of distance traveled. In step 113, the system determines the odometer reading $d(t_0;t_f)$. In step 115, the LD unit or microprocessor computes the first error ratio, $\epsilon 1$ or $\epsilon 1'$, defined in Eq. (3) or Eq. (5). In step 117, the LD unit or microprocessor analyzes the signum and magnitude of the error ratio $\epsilon 1$ or $\epsilon 1'$ and optionally displays this error ratio, for use by a vehicle user. In step 119, the system optionally adjusts the vehicle odometer, using the odometer/speedometer adjustment mechanism 45 (FIG. 2), to minimize or remove the vehicle odometer error associated with the first error ratio $\epsilon 1$ or $\epsilon 1'$. Optionally, the system recycles to step 103 or continues to step 121.

If the answer to the inquiry in step 109 is "no," the system determines, in step 121, if the second calibration approach is to be used, in which the speedometer is calibrated against the LD unit. If the answer to the inquiry in step 121 is "yes," the LD unit or microprocessor determines the average velocity $v(avg;j)$ (j=1,2 or 3) of the LD unit, as defined in Eq. (6) or Eq. (9) in step 123. The system also determines the average speed $v=V^\wedge$ registered by the speedometer, in step 125. The system then computes a second error ratio $\epsilon 2$, defined in Eq. (7), a second error ratio $\epsilon 2'$, defined in Eq. (8), or a second error ratio $\epsilon 2''$, defined in Eq. (11), in step 127. In step 129, the LD unit or microprocessor analyzes the signum and magnitude of the second error ratio, $\epsilon 2$ or $\epsilon 2'$ or $\epsilon 2''$, and optionally displays this second error ratio, for use by a vehicle user. In step 131, the system optionally adjusts the vehicle speedometer, using the odometer/speedometer adjustment mechanism 45 (FIG. 2), to minimize or remove the vehicle speedometer error associated with the second error ratio $\epsilon 2$ or $\epsilon 2'$ or $\epsilon 2''$. The system recycles to step 103. If the answer to the inquiry in step 121 is "no," the system also recycles to step 103.

The LD unit 13 may receive and process GPS signals, GLONASS signals, LORAN signals, Omega signals, Tacan signals, Decca signals, JTIDS Relnav signals, PLRS signals, VOR/DME signals or signals from other LD signal sources. Many of these LD signal sources are discussed by Tom Logsdon in *The Navstar Global Positioning System*, Van Nostrand Reinhold, New York, 1991, pp. 34–47. The LORAN system is discussed in *LORAN-C USER HANDBOOK*, U.S. Department of Transportation, U.S. Coast Guard Publication COMDTPUB P16562.6, 1992. Another possible source of LD signals is the FM subcarrier system disclosed by Kelley et al in U.S. Pat. No. 5,173,710 and in subsequent patents.

We claim:

1. Apparatus for determination of the length of a path traveled by a vehicle at a sequence of selected times, the apparatus comprising:

a location determination (LD) unit, transported by a vehicle, that receives and processes LD signals to determine location coordinates of a present location L and speed v of the LD unit at one or more selected observation times and to determine a location at which a vehicle arrest event occurs, at which the LD unit speed v is no greater than a selected positive speed threshold for a continuous time interval of length $\Delta t$ that is greater than a selected positive time interval length; and a distance measuring mechanism that measures a cumulative distance traveled by the vehicle from a selected earlier time to the present time.

2. The apparatus of claim 1, wherein said selected earlier time is taken to be an earlier time at which said vehicle arrest event occurred.

3. The apparatus of claim 1, wherein said distance measuring mechanism comprises an odometer, connected to said vehicle, that measures a cumulative distance traveled by said vehicle.

4. The apparatus of claim 1, wherein said distance measuring mechanism comprises a microprocessor, connected to said LD unit, that receives said LD unit present location coordinates and observation times from said LD unit at a sequence of sample times $t_i$, estimates the distance $\Delta d(t_{i-1};t_i)$ that said LD unit has moved in the time between two consecutive sample times, and accumulates the sum of the distances $\Delta d(t_{i-1};t_i)$.

5. The apparatus of claim 1, further comprising memory means, connected to said LD unit, for receiving and storing said location coordinates and said observation time for at least one of: a time at which said vehicle arrest event begins, a time at which said vehicle arrest event ends, and the length of time consumed by said vehicle arrest event.

6. The apparatus of claim 1, further comprising a display, connected to said LD unit, that receives and displays, in at least one of visually perceptible form and audibly perceptible form, said location coordinates and said observation time for at least one of: a time at which said vehicle arrest event begins, a time at which said vehicle arrest event ends, and the length of time consumed by said vehicle arrest event.

7. The apparatus of claim 1, further comprising a printer, connected to said LD unit, that receives and prints out said location coordinates and said observation time for at least one of: a time at which said vehicle arrest event begins, a time at which said vehicle arrest event ends, and the length of time consumed by said vehicle arrest event.

8. The apparatus of claim 1, further comprising a data entry mechanism, connected to said LD unit, for entering information that characterizes at least one vehicle arrest event.

9. The apparatus of claim 8, wherein said data entry mechanism comprises at least one of:

a keyboard with at least one key that allows entry of said information that characterizes said vehicle arrest event;

a voice recorder and a voice-to-digital conversion device that converts a voice input signal to a digital signal that can be stored, which allow entry of said information that characterizes said vehicle arrest event; and a signal receiver that receives and allows entry of said information that characterizes said vehicle arrest event.

10. The apparatus of claim 8, wherein said data entry mechanism allows entry of spatial location of an anticipated vehicle arrest event, and, when the anticipated vehicle arrest event occurs, said LD unit records or confirms that the anticipated vehicle arrest event has occurred.

11. The apparatus of claim 1, wherein said LD unit comprises an LD signal antenna that receives said LD signals and an LD signal receiver/processor that receives and processes said LD signals from the LD signal antenna.

12. The apparatus of claim 11, wherein said LD antenna and said LD receiver/processor are both located on a handheld device that can be placed in or removed from said vehicle.

13. The apparatus of claim 11, wherein said LD antenna and said LD receiver/processor are both mounted on or in said vehicle.

14. The apparatus of claim 11, wherein one of said LD antenna and said LD) receiver/processor is mounted on or in said vehicle and the other of said LD antenna and said LD receiver/processor is located on a handheld device that can be placed in or removed from said vehicle.

15. The apparatus of claim 14, further comprising a short range communications mechanism that allows said LD antenna to transmit LD signal information to said LD receiver/processor.

16. The apparatus of claim 14, further comprising an electronic cradle, mounted on or in said vehicle, that receives said handheld device and establishes an electronic connection between said LD antenna and said LD receiver/processor.

17. The apparatus of claim 16, wherein said electrical connection between said LD antenna and said LD receiver/processor comprises a signal bus.

18. A method for determination of the length of a path traveled by a vehicle at a sequence of selected times, the method comprising the steps of:

receiving and processing location determination (LD) signals at an LD unit, transported by a vehicle, and determining location coordinates of a present location L and speed v of the LD unit at one or more selected observation times, and determining a location at which an vehicle arrest event occurs, at which the LD unit speed v is no greater than a selected positive speed threshold for a continuous time interval of length $\Delta t$ that is greater than a selected positive time interval length; and estimating and recording the distance traveled by the vehicle from a selected earlier time to the present time.

19. The method of claim 18, further comprising the step of choosing said selected earlier time to be an earlier time at which said vehicle arrest event occurred.

20. The method of claim 18, further comprising the step of estimating said distance traveled by said vehicle using an odometer, connected to said vehicle, that measures a cumulative distance traveled by said vehicle.

21. The method of claim 18, further comprising the step of estimating said distance traveled by said vehicle using a microprocessor to receive said location coordinates for said LD unit at a sequence of sample times $t_i$, estimate the distance $\Delta d(t_{i-1};t_i)$ that said LD unit has moved in the time between two consecutive sample times, and accumulate the sum of the distances $\Delta d(t_{i-1};t_i)$.

22. The method of claim 18, further comprising the steps of:

receiving and storing said location coordinates and said observation time for at least one of: a time at which said vehicle arrest event begins, a time at which said vehicle arrest event ends, and the time consumed by said vehicle arrest event.

23. The method of claim 18, further comprising the step of:

receiving and displaying, in at least one of visually perceptible form and audibly perceptible form, said location coordinates and said observation time for at least one of: a time at which said vehicle arrest event begins, a time at which said vehicle arrest event ends, and the time consumed by said vehicle arrest event.

24. The method of claim 18, further comprising the step of receiving and printing out said location coordinates and said observation time for at least one of: a time at which said vehicle arrest event begins, a time at which said vehicle arrest event ends, and the time consumed by said vehicle arrest event.

25. The method of claim 18, further comprising the step of entering information that characterizes said vehicle arrest event into a database carried by said vehicle.

26. The method of claim 25, wherein said step of entering said information that characterizes said vehicle arrest event into said database comprises at least one of:

using a keyboard with at least one key that allows entry of said vehicle arrest information;

using a voice recorder and a voice-to-digital conversion device, which convert a voice input signal to a digital signal that can be stored, which receive and convert said vehicle arrest information into digital signals; and using a signal receiver that receives and allows entry of said vehicle arrest information.

27. The method of claim 25, wherein said step of entering said information comprises entering the spatial location of an anticipated vehicle arrest event into said database, and further comprising the step of using said LD unit to subsequently confirm occurrence of the anticipated vehicle arrest event, when the anticipated vehicle arrest event occurs.

28. The method of claim 18, further comprising the step of including in said LD unit an LD signal antenna that receives said LD signals and an LD signal receiver/processor that receives and processes said LD signals from the LD signal antenna.

29. The method of claim 28, further comprising the step of locating said LD antenna and said LD receiver/processor on a handheld device that can be placed in or removed from said vehicle.

30. The method of claim 28, further comprising the step of mounting said LD antenna and said LD receiver/processor on or in said vehicle.

31. The method of claim 28, further comprising the step of mounting one of said LD antenna and said LD receiver/processor on or in said vehicle and mounting the other of said LD antenna and said LD receiver/processor on a handheld device that can be placed in or removed from said vehicle.

32. The method of claim 31, further comprising the step of transmitting LD signal information from said LD antenna to said LD receiver/processor using a short range communications mechanism.

33. The method of claim 31, further comprising the step of receiving said handheld device in an electronic cradle, mounted on or in said vehicle, that establishes an electronic connection between said LD antenna and said LD receiver/processor.

34. The method of claim 33, further comprising the step of establishing said electrical connection between said LD antenna and said LD receiver/processor using a signal bus.

\* \* \* \* \*